United States Patent
Muro et al.

(10) Patent No.: US 7,400,441 B2
(45) Date of Patent: Jul. 15, 2008

(54) OPTICAL AMPLIFIER, OPTICAL AMPLIFICATION REPEATER AND PUMP LIGHT SUPPLY CONTROL METHOD

(75) Inventors: Shinichirou Muro, Kawasaki (JP); Yasushi Sugaya, Kawasaki (JP); Etsuko Hayashi, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 11/831,252

(22) Filed: Jul. 31, 2007

(65) Prior Publication Data

US 2007/0268569 A1   Nov. 22, 2007

Related U.S. Application Data (63) Continuation of application No. PCT/JP2005/001958, filed on Feb. 9, 2005.

(51) Int. Cl.
H01S 3/00 (2006.01)
(52) U.S. Cl. ............... 359/334; 359/341.32; 359/337.5
(58) Field of Classification Search ............ 359/341.32, 359/341.3, 337.5, 337.4, 334
See application file for complete search history.

(56) References Cited

U.S. PATENT DOCUMENTS

| | | | |
|---|---|---|---|
| 6,172,803 B1 | 1/2001 | Masuda et al. | |
| 6,292,288 B1 | 9/2001 | Akasaka et al. | |
| 6,624,926 B1 | 9/2003 | Hayashi et al. | |
| 6,657,774 B1 | 12/2003 | Evans et al. | |
| 6,922,282 B2 * | 7/2005 | Onaka et al. | 359/341.32 |
| 2006/0209394 A1 * | 9/2006 | Papernyi et al. | 359/341.33 |

FOREIGN PATENT DOCUMENTS

| | | |
|---|---|---|
| JP | 6-252486 | 9/1994 |
| JP | 10-107352 | 4/1998 |
| JP | 11-84440 | 3/1999 |
| JP | 2000-98433 | 4/2000 |
| JP | 2002-72262 | 3/2002 |
| JP | 2003-110178 | 4/2003 |
| JP | 2003-264511 | 9/2003 |
| JP | 2003-283019 | 10/2003 |
| JP | 2004-511004 | 4/2004 |

OTHER PUBLICATIONS

International Search Report of International Published Application No. PCT/JP2005/001958 (mailed Feb. 9, 2005).

* cited by examiner

*Primary Examiner*—Mark Hellner
(74) *Attorney, Agent, or Firm*—Staas & Halsey LLP (57) ABSTRACT

There is provided an optical amplifier including a Raman amplification medium, a rare earth doped fiber located at a latter stage of the Raman amplification medium, a first pump light outputting unit for outputting pump light with a plurality of wavelengths, a variable distribution element for distributing the pump light with the plurality of wavelengths, outputted from the first pump light outputting unit, to the Raman amplification medium and the rare earth doped fiber in a variable distribution ratio for each wavelength, and a control unit for individually controlling the distribution ratio of the pump light with the plurality of wavelengths in the variable distribution element and the power of the pump light with the plurality of wavelengths from the first pump light outputting unit in accordance with a wavelength arrangement of each of signal lights wavelength-multiplexed into the wavelength-multiplexed signal light.

13 Claims, 9 Drawing Sheets

OPTICAL AMPLIFIER, OPTICAL AMPLIFICATION REPEATER AND PUMP LIGHT SUPPLY CONTROL METHOD

This application is a continuation application, filed under 35 USC 111(a), of International Application PCT/JP2005/001958, filed Feb. 9, 2005.

TECHNICAL FIELD

The present invention relates to an optical amplifier, optical amplification repeater and pump light supply control method suitable for use in an optical transmission system.

BACKGROUND ART

An optical amplifier is for optically amplifying a signal directly to compensate for a loss occurring when an optical signal propagates in an optical fiber transmission path in an optical transmission system and further for losses in optical parts/optical modules, and it has an optical fiber medium for the optical amplification and an equipment for supplying pump light. This pump light supplying equipment supplies pump light with a predetermined wavelength to the optical fiber medium for the optical amplification, thereby placing the optical fiber medium into an activated state. The signal light is optically amplified and outputted when a signal is inputted to this optical fiber medium placed into the activated state.

In a recent-year optical amplification repeating transmission system, a rare earth doped optical fiber amplifier in which a rare earth element ion such as Erbium is doped and a Raman amplifier utilizing a Raman induced scattering characteristic of an optical fiber have been applied as an optical fiber amplifier medium. In particular, a long-distance large-capacity transmission system based on a wavelength multiplexing (Wavelength Division Multiplexing; WDM) transmission technique, attention has been paid to a Raman amplification technique for the purpose of the improvement of performance, and an optical repeater has frequently been configured on the basis of a combination thereof with a rare earth doped optical fiber amplifier represented by an EDFA (Erbium Doped Fiber Amplifier).

Although an optical fiber serving as a transmission path and a dispersion compensation fiber which compensates for dispersion in an optical amplification repeating transmission system has merely being a loss medium so far, owing to the realization of an pump light source capable of outputting a single mode of several hundreds mW, the introduction of a Raman amplifier expectable to improve the OSNR characteristic has been in progress. That is, since the amplification medium of this Raman amplifier has employed a transmission path optical fiber or dispersion compensation fiber which has been a loss medium so far, the effective improvement of the OSNR in a transmission path is expectable.

In a case in which a quartz-based optical fiber is used as an amplification medium, the Raman amplification has a peak at a lower frequency by approximately 13.2 THz (approximately 100 nm when the excitation wavelength is a 1.4 μm band) than an pump light frequency and, in most cases, it has an asymmetrical optical amplification band. Moreover, it is expectable that optical amplification bands are superposed by introducing pump lights with a plurality of different wavelengths into an optical fiber so as to secure the flattening of the output light level according to wavelength for achieving a broadband signal light amplification.

As optical amplification repeaters in the actual optical amplifier repeating transmission system, there have been reported a configuration of an amplification repeater based on a combination between an EDFA and a Distributed Raman Amplifier (DRA) in which a transmission line serves as an amplification medium and excitation wavelengths, which are 2 or 3 in number, are introduced thereinto to realize the same bandwidth as that of an EDFA with a wavelength of 30 nm, a configuration of a dispersion compensation fiber Raman amplifier (DCFRA) designed to accomplish the Raman amplification on a dispersion compensation fiber, and other configurations (see Patent Document 1).

Thus, the mainstream of the Raman amplifier has been a configuration in which a large number of excitation wavelengths are available for the purpose of broadbandization of a wavelength band functioning as an amplification band. Accordingly, the optical amplification repeater has a Raman pump light source in addition to the pump light source for the EDFA, so the power dissipation for the pump light sources tends to increase and the packaging area tends to increase due to the heat sink for the thermal emission. For this reason, the optical amplifier requires the reduction of power dissipation of the excitation sources.

Furthermore, different transmission distances and transmission line losses occur in a land optical transmission system, and the signal level to be inputted to an optical amplification repeater stands at a different value for each transmission span. For the design of an optical amplifier, when an optical amplifier is designed so as to maintain the flatness characteristic of an output wavelength according to such a signal input level range, a large amount of optical amplifier menu takes place, which creates undesirable problems in management cost, increase in stock and other problems. For this reason, in most cases, an optical amplifier requires a wide signal input power dynamic range while maintaining the flatness characteristic.

In particular, in the case of a Raman amplifier, since a tilt characteristic largely varies depending upon a wavelength arrangement of an inputted optical signal due to a Raman effect between optical signals, for carrying out the Raman amplification employing pump light with a plurality of wavelengths, there is a need to supply pump light with a plurality of wavelengths in a power ratio so as to maintain the flatness characteristic of an output signal light wavelength according to a wavelength arrangement of an inputted optical signal. In a case in which a rare earth doped fiber amplifier is located at the latter state of a Raman amplification medium, there is a need to consider a tilt characteristic of an output of this rare earth doped fiber amplifier.

Among conventional optical amplifiers, there is an optical amplifier designed to control a Raman gain by controlling a branch ratio of one-system pump light and an excitation intensity while supplying this pump light to a fiber amplifier and a Raman amplifier for the purpose of securing the aforesaid signal input power dynamic range (see Patent Document 2).

As well-known other techniques related to the invention of the subject application, there are techniques disclosed in the Patent Documents 3 and 4.

Patent Document 1: Japanese Patent Laid-Open No. 2000-98433
Patent Document 2: Japanese Patent Laid-Open No. 2003-283019
Patent Document 3: PCT Japan National Publication No. 2004-511004
Patent Document 4: Japanese Patent Laid-Open No. HEI 11-84440

DISCLOSURE OF THE INVENTION

Problems to be Solved by the Invention

However, since the technique disclosed in the aforesaid Patent Document 2 is not designed as a Raman amplifier so as to individually change a branch ratio of pump light with a plurality of wavelengths, difficulty is encountered in securing the flatness characteristic of output signal light according to a wavelength arrangement of inputted signal light as mentioned above.

Moreover, as well as the aforesaid case, each of the techniques disclosed in the Patent Documents 3 and 4 cannot secure the flatness characteristic of output signal light according to a wavelength arrangement of inputted signal light.

The present invention has been developed in view of these problems, and it is an object of the invention to secure the flatness characteristic of output signal light according to a wavelength arrangement of inputted signal light.

Another object of the invention is to achieve the enhancement of usability of pump light.

Means for Solving Problems

For achieving the above-mentioned purposes, an optical amplifier according to the present invention comprises a Raman amplification medium receiving wavelength-multiplexed signal light, a rare earth doped fiber located at a latter stage of the Raman amplification medium, a first pump light outputting unit made to output pump light with a plurality of wavelengths including a wavelength which fulfills an amplification function for the wavelength-multiplexed signal light in both the Raman amplification medium and the rare earth doped fiber, a variable distribution element made to distribute the pump light with the plurality of wavelengths, outputted from the first pump light outputting unit, to the Raman amplification medium and the rare earth doped fiber in a variable distribution ratio for each wavelength, and a control unit for individually controlling the distribution ratio for each wavelengths in the variable distribution element and power of the pump light with the plurality of wavelengths from the first pump light outputting unit in accordance with a wavelength arrangement of each of signal lights wavelength-multiplexed into the wavelength-multiplexed signal light.

Preferably, in the foregoing optical amplifier, the Raman amplification medium and the rare earth doped fiber are connected in the order of the Raman amplification medium to the rare earth doped fiber.

Moreover, a dispersion compensation fiber can be used as the Raman amplification medium so as to carry out discrete Raman amplifier, and a transmission line fiber can also be used as the Raman amplification medium to carry out a distributed Raman amplifier.

Still moreover, it is also appropriate that, in addition to the first pump light outputting unit, a second pump light outputting unit is provided to excite the rare earth doped fiber.

Yet moreover, preferably, the control unit includes a distribution ratio control unit for controlling a distribution ratio in the variable distribution element and an excitation control unit for controlling an pump light power to be outputted from the first pump light outputting unit, with the distribution ratio control unit and the excitation control unit being controlled in accordance with a wavelength of each of the signal lights multiplexed into the wavelength-multiplexed signal light.

Furthermore, an optical amplification repeater according to the present invention, which is connected to an input side optical transmission line and an output side optical transmission line to relay wavelength multiplexed light, comprises a rare earth doped fiber, a first pump light outputting unit made to output pump light with a plurality of wavelengths including a wavelength which fulfills an amplification function for the wavelength-multiplexed signal light in both the input side optical transmission line and the rare earth doped fiber, a variable distribution element made to distribute the pump light to the input side optical transmission line and the rare earth doped fiber in a variable distribution ratio, and a control unit for individually controlling each of the distribution ratio of the pump light with the plurality of wavelengths in the variable distribution element and power of the pump light with a plurality of wavelengths from the first pump light outputting unit in accordance with a wavelength arrangement of each of signal lights wavelength-multiplexed into the wavelength-multiplexed signal light.

Still furthermore, an pump light supply control method according to the present invention for use in an optical amplifier including a Raman amplification medium receiving wavelength-multiplexed signal light, a rare earth doped fiber located at a latter stage of the Raman amplification medium, a first pump light outputting unit made to output pump light with a plurality of wavelengths including a wavelength which fulfills an amplification function for the wavelength-multiplexed signal light in both the Raman amplification medium and the rare earth doped fiber, a variable distribution element made to distribute the pump light with the plurality of wavelengths, outputted from the first pump light outputting unit, to the Raman amplification medium and the rare earth doped fiber in a variable distribution ratio for each wavelength, and a second pump light outputting unit for exciting the rare earth doped fiber separately from the first pump light outputting unit, comprises a step of, at activation of the optical amplifier, setting a distribution ratio in the variable distribution element so as to intensively supply the pump light from the first pump light outputting unit to the Raman amplification medium according to a wavelength arrangement of each of signal lights wavelength-multiplexed into the wavelength-multiplexed signal light, and then controlling pump light power in the first pump light outputting unit and the distribution ratio in the variable distribution element so that an output of the Raman amplification medium is set to provide a level of a Raman amplification output reaching a controlled target value and exceed a lower limit value set as an index for preventing an pump light spectrum from becoming unstable, and a step of supplying the pump light from the second pump light outputting unit to the rare earth doped fiber so that a level of output signal light from the optical amplifier reaches a target output level of the entire optical amplifier, and controlling the pump light power in the first pump light outputting unit and the distribution ratio in the variable distribution element.

Yet furthermore, in the above-mentioned pump light supply control method, it is also acceptable that, at a change of the target output level of the entire optical amplifier, the pump light power in the first pump light outputting unit is controlled to be changed so that the level of the output signal light from the optical amplifier reaches a target output level after changed, and the distribution ratio in the variable distribution element is controlled to be changed so that the Raman amplification output of the Raman amplification medium, which varies due to the change of the pump light power in the first pump light outputting unit, reaches a Raman amplification output which is the controlled target value, and the pump light power in the first pump light outputting unit and the distribution ratio in the variable distribution element are controlled so as to flatten an inclination of an output signal light power wavelength characteristic stemming from a change of a gain of the rare earth doped fiber amplifier due to the control on the change of the distribution ratio in the variable distribution element.

Advantages of the Invention

Thus, according to the present invention, since the first pump light outputting unit and the variable distribution element carry out the optical amplification in each of a Raman amplification medium and a rare earth doped fiber, by appropriately adjusting a distribution ratio of a variable distribution element while sharing pump light from the first pump light outputting unit, in addition to advantages of securing the flatness characteristic of output signal light according to wavelength arrangement of inputted signal light and controlling an optical amplifier output level or optical amplifier gain while improving the noise characteristic, there is an advantage of enhancing the efficiency of dissipation power needed for the output of pump light.

DESCRIPTION OF REFERENCE NUMERALS 1 optical amplifier
2 dispersion compensation fiber (Raman Amplification Medium)
3 Erbium-doped optical fiber (rare earth doped fiber)
4-1, 4-2 first, second pump light outputting unit
4a, 4b LD
5 variable distribution element
5a, 5b power distribution ratio variable coupler
5c, 5d and WDM coupler
6a to 6d PD
7 excitation control circuit (excitation control unit)
8 distribution ratio control circuit (distribution ratio control unit)
9 amplifier output setting circuit
10a to 10c branch coupler
11a to 11c multiplexer
12a to 12d optical isolator
13 wavelength filter
20 optical amplification repeater
22 transmission line fiber
23 EDF
24-1, 24-2 first, second pump light outputting unit
25 variable distribution element
26a to 26d PD
27 excitation control circuit (excitation control unit)
28 distribution ratio control circuit (distribution ratio control unit)
29 amplifier output setting circuit
30a to 30c branch coupler
31a to 31c multiplexer
32a to 32c optical isolator
33 wavelength filter
34 transmission line fiber
35 optical amplifier
40 control unit

BEST MODE FOR CARRYING OUT THE INVENTION

Embodiments of the present invention will be described hereinbelow with reference to the drawings. A mode for carrying out the invention is not limited to the embodiment described below. In addition to the above-mentioned object of the present invention, other technical problems, means for solving these technical problems and advantages will become apparent through the disclosure of the following embodiments.

(a) Description of First Embodiment

Figure 1:
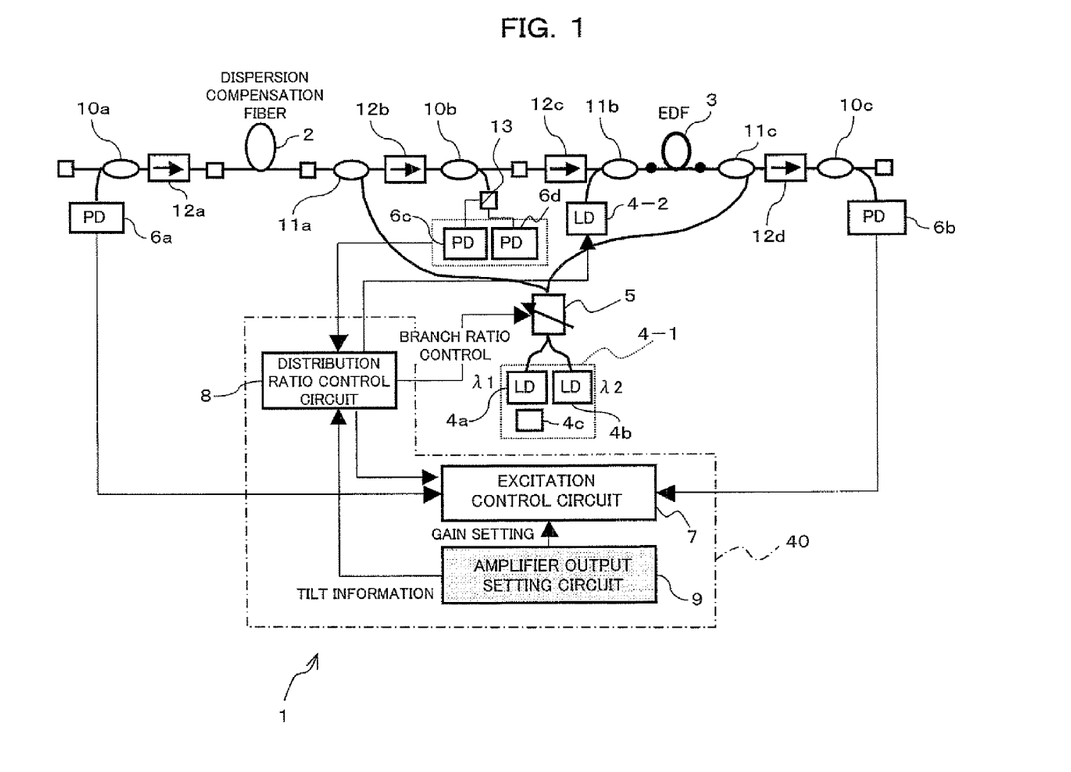
FIG. 1 is an illustration of an optical amplifier according to a first embodiment of the present invention.

FIG. 1 is an illustration of an optical amplifier 1 according to a first embodiment of the present invention. In this optical amplifier 1, a dispersion compensation fiber (DCF) 2 which serves as a Raman amplification medium and an Erbium-doped optical fiber (EDF) 3 which is a rare earth doped fiber are cascade-connected to each other in this order from the signal input side, and the optical amplifier 1 further includes first and second pump light outputting units 4-1 and 4-2, a variable distribution element 5, PDs (Photo Diodes) 6a to 6d, an excitation control circuit (excitation control unit) 7, a distribution ratio control circuit (distribution ratio control unit) 8, an amplifier output setting circuit 9, branch couplers 10a to 10c, multiplexers 11a to 11c, optical isolators 12a to 12d and a wavelength filter 13.

The optical amplifier 1 according to the first embodiment is applicable as an optical amplification repeater in a WDM optical transmission system, and pump light comprising a plurality of excitation wavelengths is outputted from the first pump light outputting unit 4-1 to the DCF 2 to accomplish the Raman amplification on the inputted signal light, while a portion of the pump light outputted from the first pump light outputting unit 4-1 is used as pump light for the EDF 3.

That is, the optical amplifier 1 includes the variable distribution element 5 capable of setting a power distribution ratio for each wavelength from the first pump light outputting unit 4-1 for allocating a portion of the pump light power to the DCF 2 for the excitation of the EDF 3.

In this case, the DCF 2 is made to compensate for the dispersion of wavelength-multiplexed signal light forming inputted signal light and further is made to receive the supply of the pump light from the first pump light outputting unit 4-1 through the variable distribution element 5, mentioned later, and the multiplexer 11a, mentioned later, thereby fulfilling a function as a Raman amplification medium capable of carrying out the Raman amplification (in a centralized constant manner) on signal light inputted. Moreover, the EDF 3 receives, as rear pump light, the supply of a portion of the pump light from the first pump light outputting unit 4-1 through the variable distribution element 5 and the multiplexer 11c and further receives, as front pump light, the supply of light from an LD (Laser Diode) 4-2 serving as a second pump light outputting unit through the multiplexer 11b for amplifying the signal light Raman-amplified in the DCF 2.

Moreover, the first pump light outputting unit 4-1 is made to output, to both the DCF 2 and the EDF 3, pump light with a plurality of wavelengths including a wavelength capable of fulfilling the amplification action with respect to inputted wavelength-multiplexed signal light and, in the first embodiment, it includes pump light sources 4a and 4b, i.e., a plurality of (for example, 2) different LDs having oscillation wavelengths $\lambda 1$ and $\lambda 2$, respectively, for the purpose of maintaining the output flatness characteristic of the Raman amplification, and further includes a level monitor 4c for monitoring an optical level outputted from each of the pump light sources 4a and 4b.

Since the pump light wavelengths $\lambda 1$ and $\lambda 2$ outputted from the pump light sources 4a and 4b are used for both the Raman amplification of the DCF 2 and the excitation of the EDF 3, for example, they can be set at wavelengths shifted by approximately 100 nm from the signal wavelength bands of 1.55 μm band and 1.58 μm band to shorter wavelength side (i.e., wavelengths of 1.45 μm band and 1.48 μm band.

The variable distribution element 5 is for distributing the pump light, outputted from the two pump light sources 4a and 4b, at a power distribution ratio set for each excitation wavelength, and the pump light distributed for each excitation wavelength can be supplied through the multiplexer 11a to the DCF 2 and supplied as rear pump light through the multiplexer 11b to the EDF 3. Moreover, this variable distribution element 5 has, for example, a configuration to be mentioned later with reference to FIG. 2, and it can distribute the pump light, outputted from the first pump light outputting unit 4-1, as pump light to the DCF 2 and the EDF 3 at a variable distribution ratio.

In the optical amplifier 1 shown in FIG. 1, PD 6a is for monitoring a level of inputted signal light to the optical amplifier 1 on the basis of the light obtained by the branch coupler 10a, while the PD 6b is for monitoring a level of outputted signal light from the optical amplifier 1 on the basis of light obtained by the branch coupler 10c.

The excitation control circuit 7 is for drive-controlling the pump light sources 4a and 4b to control the power of pump lights P$\lambda 1$ and P$\lambda 2$ to be outputted from these pump light sources 4a and 4b. In the first embodiment, the excitation control circuit 7 can be designed to control the pump light sources 4a and 4b for achieving gain-fixed control so that the gain of the optical amplifier 1 becomes a gain set in the amplifier output setting circuit 9, mentioned later, or a Raman amplification output level (first level), thereby setting the tilt characteristic obtained through monitor results from the PDs 6a and 6b at the controlled target determined according to a wavelength arrangement of each of signal lights wavelength-multiplexed into a wavelength-multiplexed signal light.

Moreover, the PDs 6c and 6d are for monitoring a signal light level, Raman-amplified in the DCF 2, for each wavelength band. For example, the PD 6c is made to monitor a signal light level on a shorter wavelength side when a signal light wavelength band is divided into two, while the PD 6d is made to monitor a signal light level on a longer wavelength side when a signal light wavelength band is divided into two. The branch coupler 10b provides a portion of the signal light Raman-amplified in the DCF 2 and, with respect to the branched light from the branch coupler 10b, the wavelength filter 13 splits the signal light wavelength band to produce two signal lights which in turn, are fed to the PDs 6c and 6d, respectively.

Still moreover, the distribution ratio control circuit 8 is for variably controlling the above-mentioned distribution ratio in the variable distribution element 5 on the basis of the aforesaid monitor results in the PDs 6c and 6d so that the wavelength gain characteristic (tilt information) set on the amplifier output setting circuit 9 on the basis of a channel arrangement of the wavelength-multiplexed light signal and the target output signal level (first level) are obtainable by the Raman amplification.

The amplifier output setting circuit 9 functions as a controlled target giving unit to provide a controlled target in the distribution ratio control circuit 8 and the excitation control circuit 7 according a wavelength arrangement of each of the signal lights wavelength-multiplexed into inputted wavelength-multiplexed signal light. That is, the distribution ratio control circuit 8 and the excitation control circuit 7 are controlled according to a wavelength of each of the signal lights wavelength-multiplexed into wavelength-multiplexed signal light.

Concretely, the amplifier output setting circuit 9 sets a Raman output signal level (first level) which is a controlled target value in the excitation control circuit 7 and the distribution ratio control circuit 8 and a controlled target level (second level) which is an optical amplifier output, and further sets the above-mentioned wavelength gain characteristic. For example, this wavelength gain characteristic can be determined on the basis of the wavelength arrangement information obtainable from a management signal in the aforesaid WDM optical transmission system. That is, the wavelength gain characteristic which is a controlled target and the distribution ratio in the variable distribution element 5 are also determined on the basis of this wavelength arrangement information.

Therefore, the above-mentioned excitation control circuit 7, distribution ratio control circuit 8 and amplifier output setting circuit 9 constitute a control unit 40 to individually control the distribution ratio of two-wavelengths pump lights P$\lambda 1$ and P$\lambda 2$ in the variable distribution element 5 and the powers of two-wavelengths pump lights P$\lambda 1$ and P$\lambda 2$ from the first pump light outputting unit 4-1 on the basis of the wavelength arrangement of the respective signal lights wavelength-multiplexed into the wavelength-multiplexed signal light.

Figure 2:
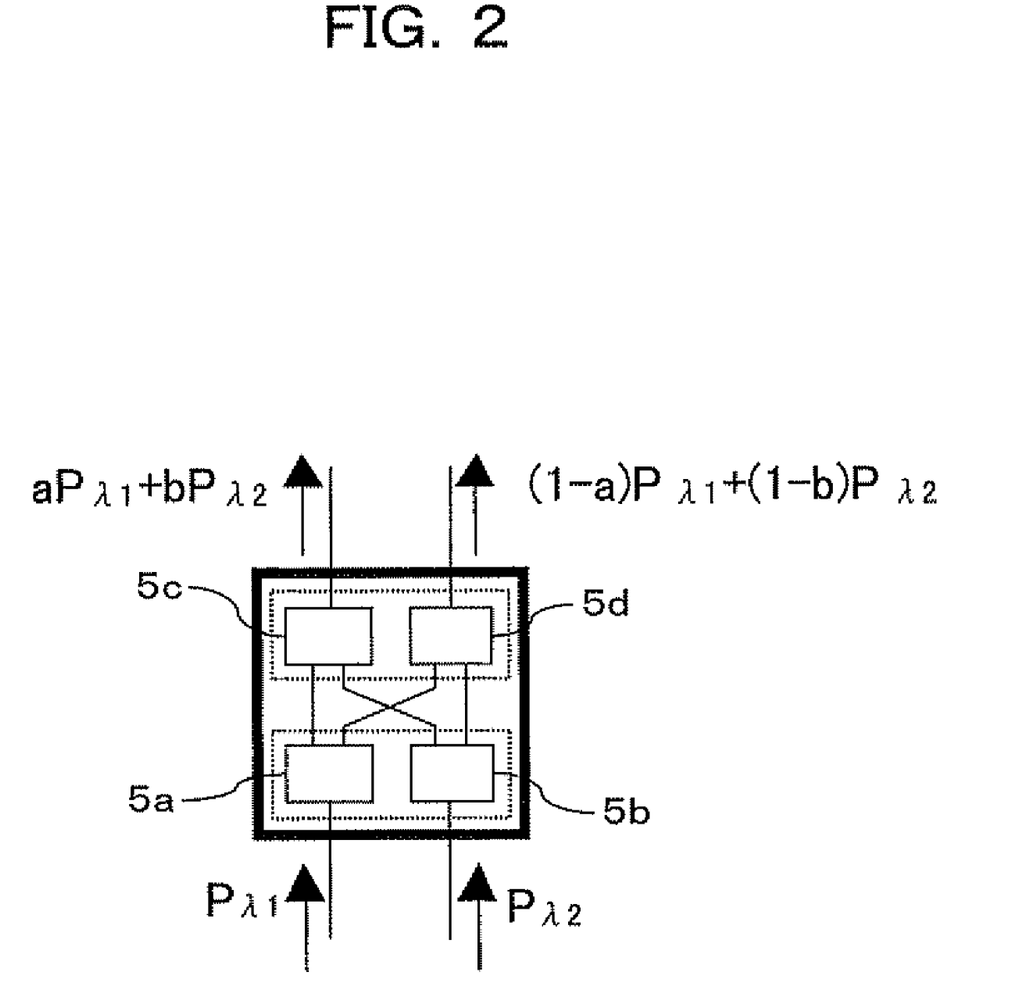
FIG. 2 is an illustration of a configuration of a variable distribution element in the first embodiment of the present invention.

FIG. 2 is an illustration of the variable distribution element 5. As shown in FIG. 2, the variable distribution element 5 in the first embodiment includes power distribution ratio variable couplers 5a, 5b and WDM couplers 5c, 5d. The power distribution ratio variable coupler 5a is for carrying out the power distribution of the pump light P$\lambda 1$ from the LD 4a into two routes, while the power distribution ratio variable coupler 5b is for carrying out the power distribution of the pump light P$\lambda 2$ from the LD 4b into two routes.

For example, under the control of the distribution ratio control circuit 8, the power distribution ratio variable coupler 5a makes the distribution of the pump light P$\lambda 1$ from the LD 4a in a distribution ratio a ($0 \leq a \leq 1$) for the Raman excitation in the DCF 2 and makes the distribution thereof in a distribution ratio (1-a) for the excitation in the EDF 3. Moreover, under the control of the distribution ratio control circuit 8, the power distribution ratio variable coupler 5b makes the distribution of the pump light P$\lambda 2$ from the LD 4b in a distribution ratio b (0≦b≦1) for the Raman excitation in the DCF 2 and makes the distribution thereof in a distribution ratio (1-b) for the excitation in the EDF 3.

Moreover, the WDM coupler 5c multiplexes the pump lights distributed by the power distribution ratio variable couplers 5a and 5b for the excitation in the DCF 2 and outputs it as pump light aPλ1+bPλ2 to the multiplexer 11a. Likewise, the WDM coupler 5d multiplexes the pump lights distributed by the power distribution ratio variable couplers 5a and 5b for the excitation in the EDF 3 and outputs it as pump light (1-a)Pλ1+(1-b)Pλ2 to the multiplexer 11c.

Thus, the variable distribution element 5 divides each of the pump light powers inputted from the LDs 4a and 4b in a ratio set under the control of the distribution ratio control circuit 8 through the use of the power distribution ratio variable couplers 5a and 5b and multiplexes the lights with different excitation wavelengths through the use of the WDM couplers 5c and 5d, thereby realizing a function to supply the pump lights to the DCF 2 and the EDF 3.

With the above-described configuration, in the optical amplifier 1 according to the first embodiment of the present invention, the inputted signal light is Raman-amplified in the DCF 2 and then amplified in the EDF 3 to be outputted as output signal light. At this time, the distribution ratio control circuit 8 controls the variable distribution element 5 on the basis of the results of monitor from the PDs 6c and 6d, so the signal light outputted from the DCF 2 has an optical level for each wavelength which is set in the amplifier output setting circuit 9.

That is, the distribution ratio control circuit 8 can set the pump light power with the wavelength λ1 and the pump light power with the wavelength λ2 constituting the pump light to be supplied to the DCF 2 through the control on a distribution ratio with respect to the variable distribution element 5, thus enabling the control according to the wavelength arrangement of a signal inputted so that the optical level (tilt information) for each wavelength has, for example, approximately flat characteristic.

Figure 3:
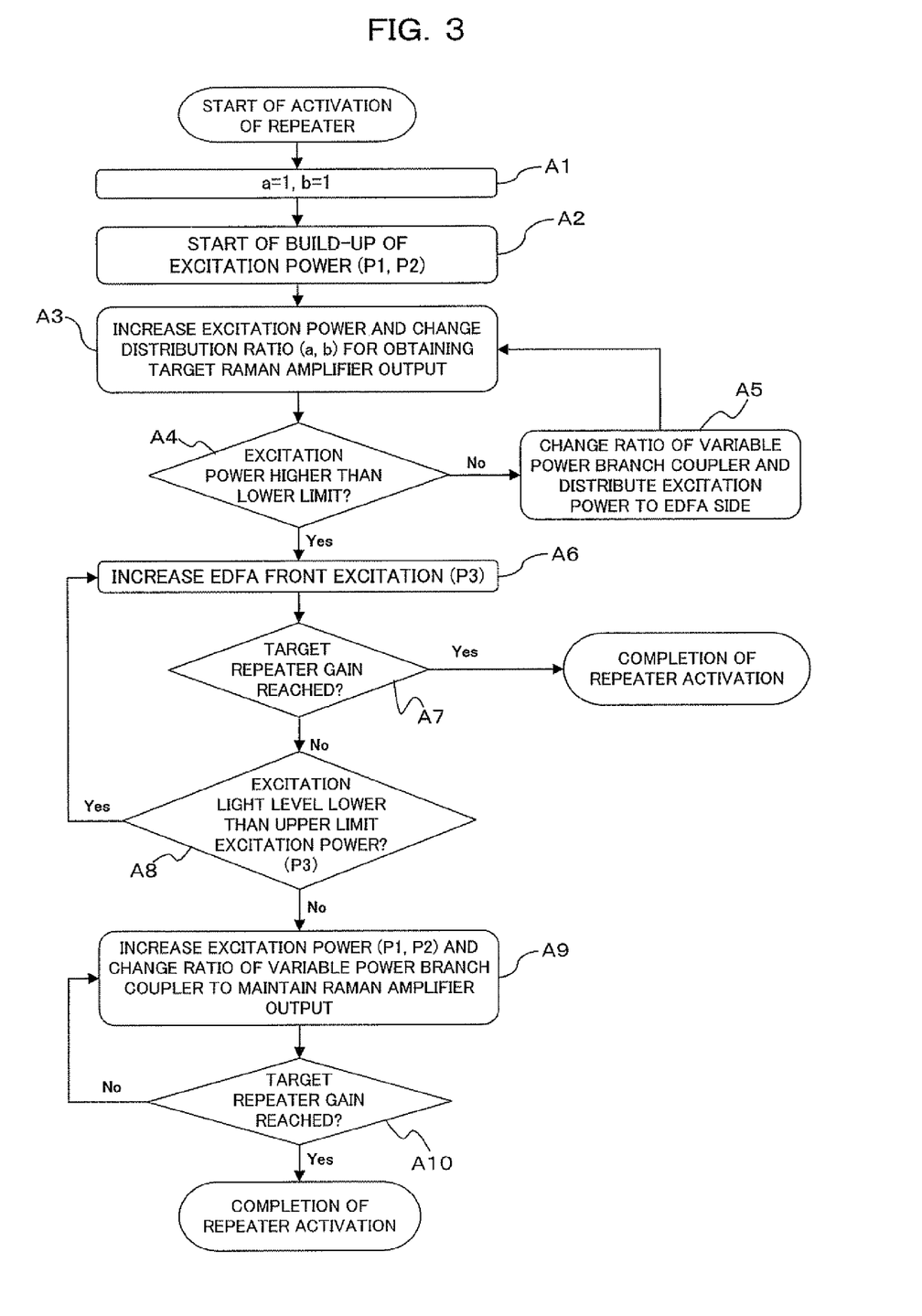
FIG. 3 is a flow chart for explaining an activation operation of the optical amplifier according to the first embodiment.

As an optical amplification repeater in a WDM optical transmission system, for starting the activation of the optical amplifier 1 according to the first embodiment, the pump lights to be supplied to the DCF 2 and the EDF 3 are set as shown in a flow chart of FIG. 3. This realizes an amplification function needed for the optical amplification repeater while maintaining the flatness characteristic of the signal light output as the foregoing optical amplifier 1 and suppressing the noise factor to as a lower value as possible in the optical amplifier 1.

Figures 4A, 4B, 4C, 4D:
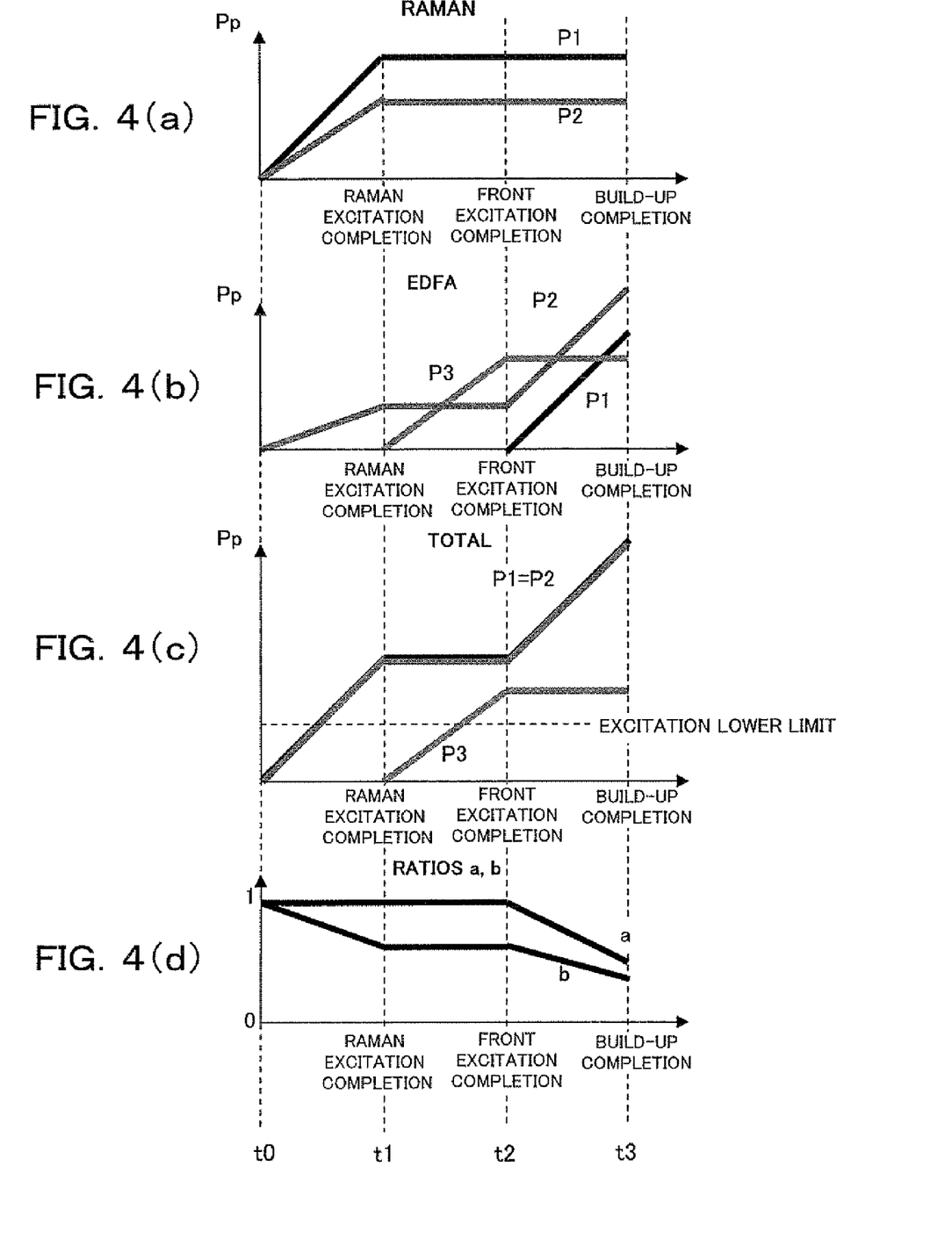
FIG. 4(a) to (d) are illustrations for explaining an pump light supply operation to be conducted when a Raman amplification gain is set at a relatively higher value.

In FIG. 4, (a) to (d) are illustrations for explaining an pump light supply operation in a case in which a Raman amplification gain is set at a relatively high value. FIG. 4(a) is a time chart showing an pump light power Pp to the DCF 2, FIG. 4(b) is a time chart showing an pump light power Pp to the EDF 3, FIG. 4(c) is a time chart showing pump light power Pp outputted from the first and second pump light outputting units 4-1 and 4-2, and FIG. 4(d) is a time chart showing a variation of distribution ratio by the variable distribution element 5. As the case of setting the Raman amplification gain of the DCF 2 at a relatively high value as shown in FIG. 4(a) to 4(d), conceivably, for example, there are a case in which the loss of the DCF 2 is relatively large or a case in which the level of inputted signal light is relatively low.

In FIG. 5, (a) to (d) are illustrations for explaining an pump light supply operation in a case in which a Raman amplification gain is set at a relatively low value. FIG. 5(a) is a time chart showing an pump light power Pp to the DCF 2, FIG. 5(b) is a time chart showing an pump light power Pp to the EDF 3, FIG. 5(c) is a time chart showing pump light power Pp outputted from the first and second pump light outputting units 4-1 and 4-2, and FIG. 5(d) is a time chart showing a variation of distribution ratio by the variable distribution element 5. As the case of setting the Raman amplification gain of the DCF 2 at a relatively low value as shown in FIG. 5(a) to 5(d), conceivably, for example, there are a case in which the loss of the DCF 2 is relatively small or a case in which the level of inputted signal light is relatively low.

First, for the activation of the optical amplifier 1, the pump light power in the first pump light outputting unit 4-1 and the distribution ratio in the variable distribution element 5 are controlled so that the output from the DCF 2 is set to provide a level (first level) of a Raman amplification output reaching a controlled target value and to exceed a lower limit value set as an index which is for preventing an pump light spectrum from becoming unstable (step A1 to A5).

That is, both the excitation power distribution ratios a and b for the DCF 2 by the power distribution ratio variable couplers 5a and 5b of the variable distribution element 5 are set at "1" as initial values. That is, as the initial values, the distribution ratios are set so that the powers of the pump lights Pλ1 and Pλ2 outputted from the pump light sources 4a and 4b are intensively supplied to the DCF 2 (step A1).

Following this, in a state where the signal light is inputted to the optical amplifier 1, the excitation control circuit 7 builds up the pump light powers from the pump light sources 4a and 4b. Thus, in the DCF 2, the inputted signal light is Raman-amplified by the variable distribution element 5 and pump light power supplied (step A2).

Moreover, the distribution ratio control in the power distribution ratio variable couplers 5a and 5b by the distribution ratio control circuit 8 and the drive control for the pump light sources 4a and 4b by the excitation control circuit 7 are implemented in cooperation with each other so as to acquire a first level Raman amplification output serving as a target and an optical power characteristic flattened with respect to a wavelength. As this flattening of the signal power characteristic relative to a wavelength, the flattening technique for a signal power characteristic of a Raman amplifier output relative to a wavelength is employable which is disclosed in Japanese Patent Laid-Open No. 2002-72262.

At this time, the excitation control circuit 7 drive-controls the pump light sources 4a and 4b so that, with respect to an optical signal Raman-amplified, the first level set in the amplifier output setting circuit 9 becomes a target level. Both the pump light sources 4a and 4b are driven to provide optical outputs having the same power [see the time points t0 to t1 in FIG. 4(c) or FIG. 5(c)] Moreover, the first level is an output signal level which is a target to be achieved by the Raman amplification in the DCF 2.

Figure 5A:
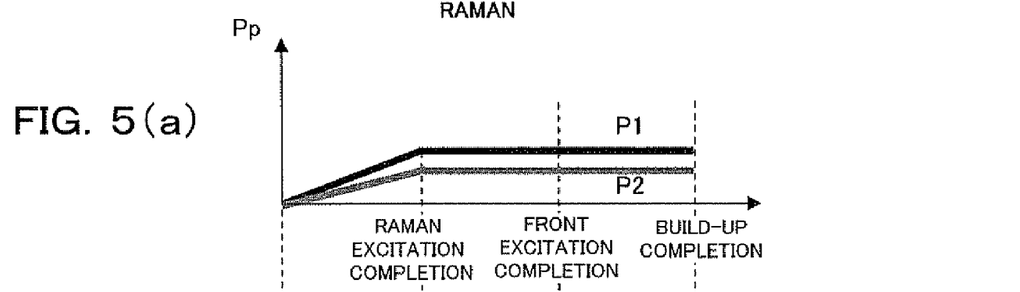
FIG. 5(a) to (d) are illustrations for explaining an pump light supply operation to be conducted when a Raman amplification gain is set at a relatively low value.
Figure 5B:
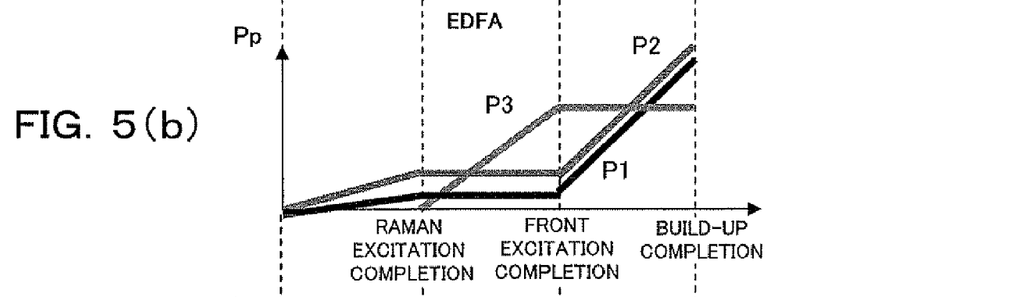
Figure 5C:
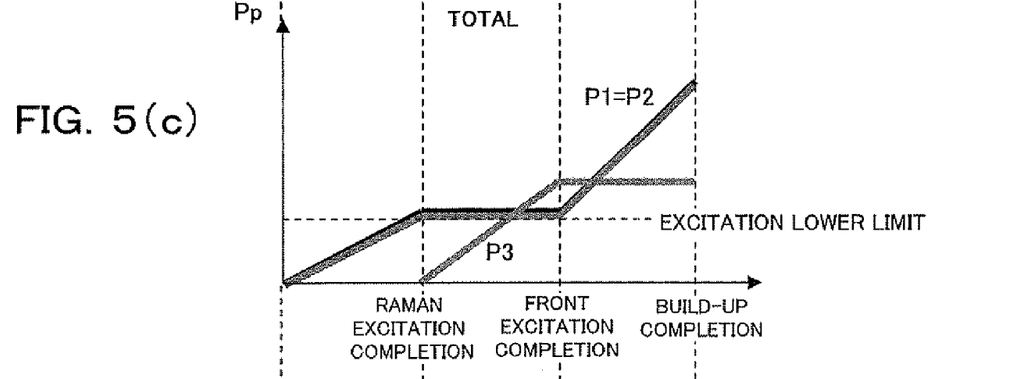
Figure 5D:
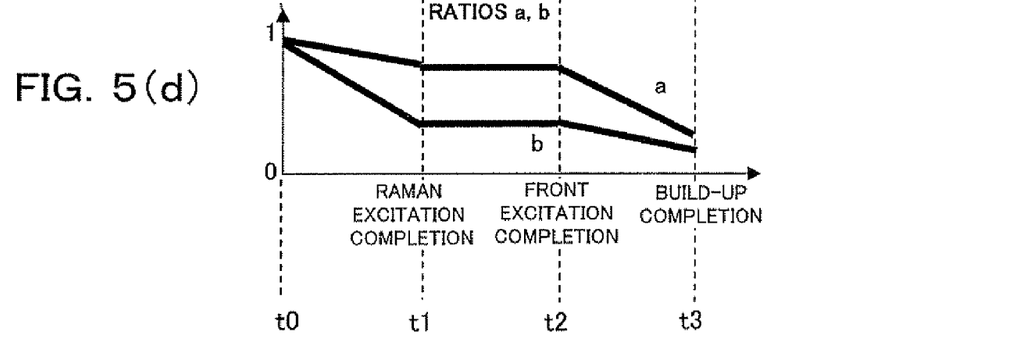

In addition, the distribution ratio control circuit 8 can control the distribution ratios in the power distribution ratio variable couplers 5a and 5b on the basis of the results of monitor from the PDs 6c and 6d so that the signal power wavelength characteristic is flattened by the Raman amplification in the DCF 2 [step A3, see the time points t0 to t1 in FIG. 4(d) or FIG. 5(d)].

Thus, even in a case in which the pump light power at the time points t0 to t1 in FIG. 4(c) or FIG. 5(c) is outputted from the first pump light outputting unit 4-1, by the distribution of the pump light in the variable distribution element 5, the pump light with the power at the time points t0 to t1 in FIG. 4(a) or FIG. 5(a) is supplied to the DCF 2 while the pump light with the power at the time points t0 to t1 in FIG. 4(b) or FIG. 5(b) is supplied to the EDF 3.

Furthermore, in a state where the output signal level to be acquired by the Raman amplification has been obtained, the distribution ratio control circuit 8 makes a decision, on the basis of a value from a level monitor 4c provided in the first pump light outputting unit 4-1, as to whether the pump light levels outputted from the pump light sources 4a and 4b are equal to or more than a lower limit which is set as an index so as to prevent the waveforms from being unstable (step A4).

At this time, if the pump light levels outputted from the pump light sources 4a and 4b are a value below the lower limit, the distribution ratio control circuit 8 controls the change of the distribution ratio in the power distribution ratio variable couplers 5a and 5b and allocates the excitation power to the EDF 3. In other words, the excitation power to be allocated to the DCF 2 is reduced by decreasing the values of the distribution ratios a and b (step A4 through No route to step A5). The excitation control circuit 7 executes the control for further increasing the excitation power in the pump light sources 4a and 4b so that the first output signal level is maintainable by the Raman amplification in the DCF 2 even in the case of this distribution ratio change (step A5 to step A3).

In this way, the control in the steps A5 and A3 repeatedly executed until the pump light power outputted from the pump light sources 4a and 4b exceeds the above-mentioned lower limit [see the time points t0 to t1 in FIG. 5(c)]. This enables obtaining a target Raman amplification output while placing the pump light power outputted from the pump light sources 4a and 4b into a stable output level above the aforesaid lower limit [Yes route from step A4, see the time point t1 in FIG. 5(c)].

That is, in a case in which a Raman amplification gain needed for the acquisition of a target optical output power becomes relatively low as shown in (a) to (d) of FIG. 5, when the distribution ratio of the pump light to the DCF 2 is relatively high, even if a target optical output power is acquired in the step A3, there is a case that the pump light power themselves from the pump light sources 4a and 4b becomes below the lower limit. Accordingly, like the step A5, the distribution ratios a and b are changed to a lower value (in this case, the ratios a and b are changed by the same values) and the pump light power from the pump light sources 4a and 4b are then increased so as to again acquire a target Raman amplification output.

Although as mentioned above, a Raman amplifier can adjust multi-wave pump light power incident on an amplification medium to change an average output level while maintaining the flatness characteristic of a signal output wavelength characteristic, in the vicinity of the threshold of optical power of pump light outputted from an pump light source, the excitation wavelength sometimes becomes unstable, which leads to an unstable Raman amplification characteristic accordingly.

In the step A1 to the step A5, in cooperation with the pump light power control, the control of the distribution ratios in the power distribution ratio variable couplers 5a and 5b is executed, thereby enabling the acquisition of a Raman amplification output at a target level while outputting pump light in a higher power region than the lower limit which is for preventing the wavelength from becoming unstable, which can eliminate the restriction using a lower limit for the pump light power as mentioned above.

When a target Raman amplification output is acquired while placing the output from the pump light sources 4a and 4b into a stable output state as mentioned above (Yes route from step A4), subsequently, for the level of output signal light from the optical amplifier 1 to reach a target output level (second level) for the entire optical amplifier 1, the pump light from the second pump light outputting unit 4-2 is supplied to the EDF 3, and the pump light power in the first pump light outputting unit 4-1 and the distribution ratio of the variable distribution element 5 are controlled (step A6 to step A10).

Concretely, the excitation control circuit 7 drive-controls the second pump light outputting unit 4-2 to activate the front pump light for the EDF 3 (step A6) and enhances the optical level until the pump light level outputted from this second pump light outputting unit 4-2 reaches an excitation power limit which is an upper limit [step A8 through Yes route to step A6, see the time points t1 to t2 in FIG. 4(b) or FIG. 5(b)]. In this connection, at the activation of this front pump light, the pump light power to be outputted from the first pump light outputting unit 4-1 and the distribution ratio in the variable distribution element 5 are set at a constant value [see the time points t1 to t2 in FIG. 4(a) to FIG. 4(d) or FIG. 5(a) to FIG. 5(d)].

At this time, in a case in which the output optical signal level from the EDF 3 becomes a second level, which is a target value, before the output level of the pump light in the second pump light outputting unit 4-2 reaches the upper limit, the activation of the optical amplifier repeater reaches completion (Yes route from step A7). Thus, the distribution ratios of the power distribution ratio variable couplers 5a and 5b, the output levels of the pump light sources 4a and 4b and the pump light output level of the second pump light outputting unit 4-2 are fixed from this time, which enables the stable output of an output optical signal with the second level.

On the other hand, even in a case in which the output level of the pump light from the second pump light outputting unit 4-2 reaches the upper limit level, if the output optical signal level from the EDF 3 does not reach the second level which is a target value, the distribution ratio control circuit 8 changes the distribution ratios of the power distribution ratio variable couplers 5a and 5b in a (approximately) same rate so as to increase the light to be supplied as the rear pump light to the EDF 3 [No route from step A7, step A8 through No route to step A6, see the time points t2 to t3 in FIG. 4(a) to FIG. 4(d) or FIG. 5(a) to FIG. 5(d)].

Also in this case, although the change of the distribution ratio is made so as to reduce the pump light to be supplied to the DCF 2, the excitation control circuit 7 executes the control to further increase the excitation power in the pump light sources 4a and 4b so that the first output signal level is maintainable by the Raman amplification in the DCF 2 (step A9).

In this case, the above-mentioned change of the distribution ratio is made at a constant rate so that the control for making the Raman amplification output constant can sufficiently follow it, and the distribution ratio is successively changed until this Raman amplification output is placed at the first level and the level of the output of the optical amplifier 1 becomes the second level which is a target value, thus increasing the pump light power to be supplied to the EDF 3 (step A9 through No route to step A10).

When the output optical signal level from the EDF 3 reaches the second level which is the target value in this way, the activation of the optical amplification repeater reaches completion [Yes route from step A10, see the time point t3 in FIG. 4(a) to FIG. 4(d) or FIG. 5(a) to FIG. 5(d)]. Therefore, the distribution ratios of the power distribution ratio variable couplers 5a and 5b, the output levels of the pump light sources 4a and 4b and the pump light output level of the second pump light outputting unit 4-2 are fixed after this, which enables the stable output of an output optical signal with the second level.

Figure 6:
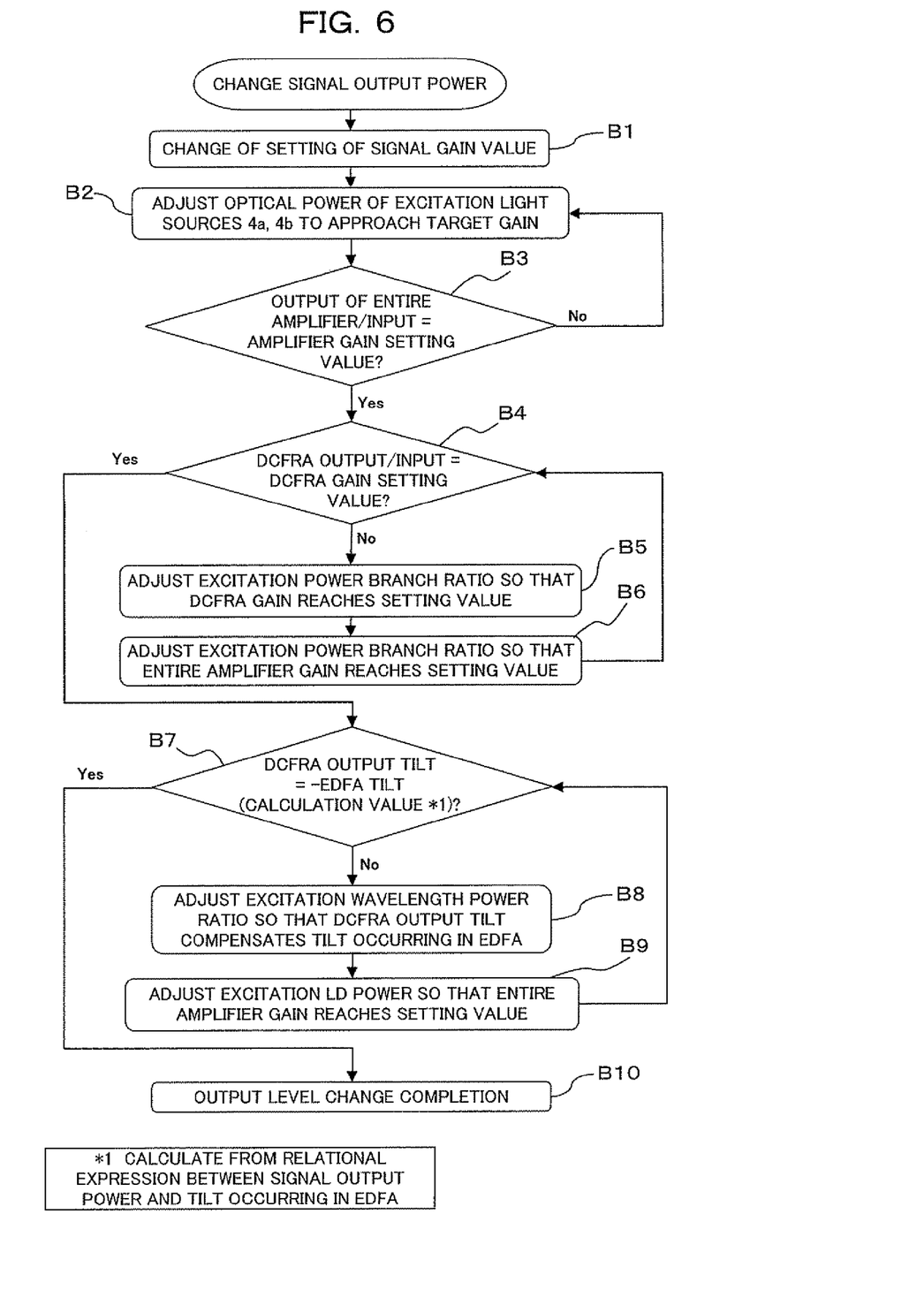
FIG. 6 is a flow chart for explaining an operation to be conducted at a change of a level of output signal light which is a controlled target value in the optical amplifier according to the first embodiment.

Moreover, in a case in which the output signal light level which is a controlled target, i.e., the value of the second level, is changed in a state where the optical amplifier 1 is in operation so as to stably output the output signal light with the second level as mentioned above, in the optical amplifier 1, the supply of the pump light is controlled as shown in the flow chart of FIG. 6. In FIG. 7, (a) to (d) are illustrations for explaining the pump light supply control in the case of a change of the output signal optical level which is the controlled target.

When the target output level is changed as the entire optical amplifier 1, the change of the pump light power in the first pump light outputting unit 4-1 is first controlled so that the level of the output signal light from the optical amplifier 1 becomes a target output level to be changed (step B1 to step B3).

That is, the level of the output signal light, i.e., the aforesaid controlled target, set in the amplifier output setting circuit 9 is changed. In this case, the controlled target gain of the optical amplifier 1 is changed so as to provide a desired output optical signal level (step B1). More specifically, the gain is increased in the case of an increase of the output optical signal level while the gain is decreased for a decrease thereof.

With respect to a gain of the Raman amplification of the DCF 2 (gain of DCFRA), also in the case of a change of the controlled target gain as the foregoing optical amplifier 1, the setting at the completion of the activation is not changed but the change of the controlled target output signal light level is handled by an increase/decrease of the gain of the amplification of the signal light in the EDF 3 as the EDFA.

Figure 7A:
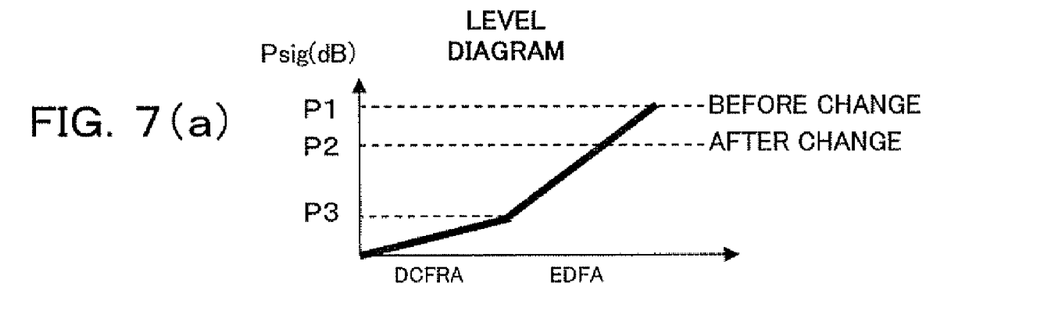
FIG. 7(a) to (d) are illustrations for explaining an operation to be conducted at a change of a level of output signal light which is a controlled target value in an optical amplifier.

Concretely, in a case in which a level diagram of an optical signal inputted to the optical amplifier 1 is in a state shown in FIG. 7(a) through the DCF 2 and the EDF 3, the output signal light level which is a controlled target stands at P1 in FIG. 7(a). For example, when the value of this P1 is decreased to P2, the change control on the pump light power from the pump light sources 4a and 4b is first implemented by the excitation control circuit 7 so that the output signal light level becomes P2.

That is, the excitation control circuit 7 changes (decreases) the pump light power from the pump light sources 4a and 4b by a predetermined unit amount until the output signal level reaches P2 (in this case, until the gain of the optical amplifier 1 becomes the changed controlled target gain) (control loop made by step B2 and No route of step B3).

Following this, the change control on the distribution ratio in the variable distribution element 5 is executed so that the Raman amplification output of the DCF 2, which varies due to a change of the pump light power in the first pump light outputting unit 4-1, becomes the Raman amplification output (first level) which is a controlled target value (control loop made by No route from step B4, step B5 and step B6).

Figure 7B:
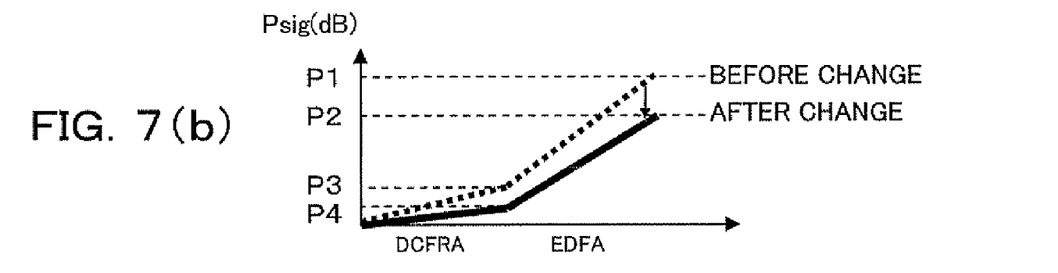

That is, since the variable distribution element 5 does not experience the change control on the distribution ratio at the time of the change of the pump light power in the step B3, as shown in FIG. 7(b), the level of the Raman amplification output also temporarily changes (decreases) from the initially set level P3 to P4.

Figure 7C:
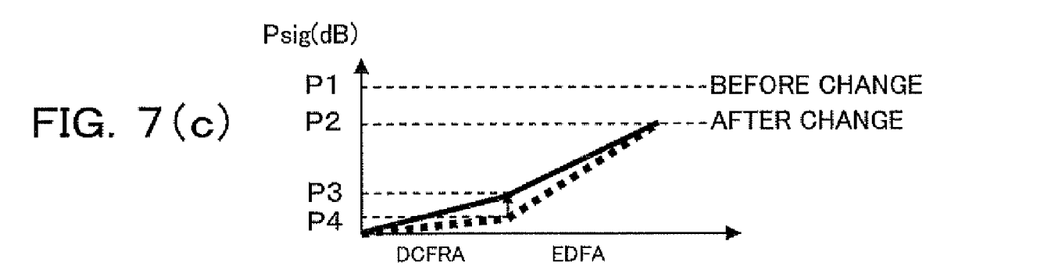
Figure 7D:
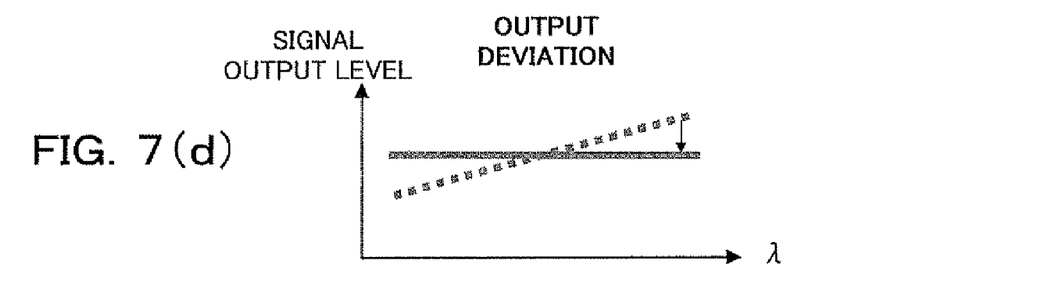

When the pump light power of the pump light sources 4a and 4b is reduced according to the control of the excitation control circuit 7 so that the output signal level of the optical amplifier 1 becomes the above-mentioned P2, the distribution ratio in the variable distribution element 5 is then controlled by the distribution ratio control circuit 8 so that the Raman amplification gain of the DCF 2 (or the output of the DCF 2) becomes the original set level P3 while maintaining that the output signal light level is still P2 [steps B4 to B6, see FIG. 7(c)]. At this time, the gain in the EDF 3 is decreased due to the change of the branch ratio along with the change of the Raman amplification gain in the DCF 2 so that the gain of the entire optical amplifier 1 is kept to be constant.

Also in this case, the branch ratio control circuit 8 executes the control to increase the branch ratio a and b repeatedly by a predetermined unit amount until the Raman amplification gain in the DCF 2 (or the output of the DCF 2) reaches the original set level P3.

Following this, the pump light power of the first pump light outputting unit 4-1 and the distribution ratio of the variable distribution element 5 are controlled so as to flatten the inclination of the output signal light power wavelength characteristic stemming from the gain change of the EDF 3 due to the change control of the distribution ratio in the variable distribution element 5 (step B7 to step B10).

That is, when the gain of the entire optical amplifier 1 is changing-controlled and the Raman amplification gain of the DCF 2 is put into a before-change state, this signifies that the gain of the EDF 3 subsequently changes and, as exemplified by a dotted line, the output signal light power wavelength characteristic (characteristic of the output signal light power for each wavelength) of the optical amplifier 1 has an inclination. For the purpose of compensating for this inclination, the branch ratio control circuit 8 adjusts the branch ratios a and b (i.e., 1-a, 1-b), thereby flattening the output signal light power for each wavelength as indicated by a solid line in FIG. 7(d). That is, the tilt characteristic of the DCFRA (DCF 2) offsets the tilt characteristic of the EDFA (EDF 3) [DCFRA output tilt=−EDFA tilt] (step B8).

Let it be assumed that the inclination of the output signal light power wavelength characteristic stemming from the gain change of the EDF 3 is calculated using a relational expression between the signal output power and the tilt occurring in the EDFA which is obtained as the characteristic of the EDF 3 in advance.

In this case, in a case in which the gain of the entire optical amplifier 1 changes due to the above-mentioned branch ratio adjustment, the excitation control circuit 7 executes the change control on the pump light power from the pump light sources 4a and 4b, thereby implementing the control to maintain the output signal light level from the optical amplifier 1 at a constant level P2 (step B9). Thereafter, the pump light power of the first pump light outputting unit 4-1 and the distribution ratio of the variable distribution element 5 are controlled until the inclination of the output signal light power wavelength characteristic stemming from the gain change of the EDF 3 is flattened and the gain of the entire optical amplifier 1 is maintained at the constant level P2 (control loop made by No route from step B7, step B8 and step B9).

Thus, even in a case in which the amplifier output setting circuit 9 has changed the target gain of the optical amplifier 1 (or output signal light level), through the cooperative control by the excitation control circuit 7 and the distribution ratio control circuit 8, the Raman amplification output level in the DCF 2 can follow the first level while providing the changed output signal light level, and the output signal light power wavelength characteristic can take a flattened state (step B7 through Yes route to step B10).

As described above, with the optical amplifier 1 according to the first embodiment of the present invention, since the first pump light outputting unit 4-1 and the variable distribution element 5 carry out the optical amplification on each of the DCF 2 and the EDF 3, thereby providing an advantage that, in a state where the pump light from the first pump light outputting unit 4-1 is shared, the control unit 40 can appropriately adjust the distribution ratio of the variable distribution element 5 according to the channel arrangement of the wavelength-multiplexed signal light to control the optical amplifier output level and the optical amplifier gain while improving the noise characteristic.

In addition, in the case of the Raman amplification by the DCF 2, the needed excitation wavelength power ratio largely varies according to the number of channels and channel arrangement of the signal light inputted, and each excitation wavelength leaves a margin in power in order to enable handling all the numbers of channels and this margin is shared as pump light for the EDFA, thereby providing an advantage that the dissipation power needed for the pump light output is utilized efficiently according to the number of channels and channel arrangement of the inputted signal light so as to reduce the dissipation power in the entire optical amplifier.

Figure 8:
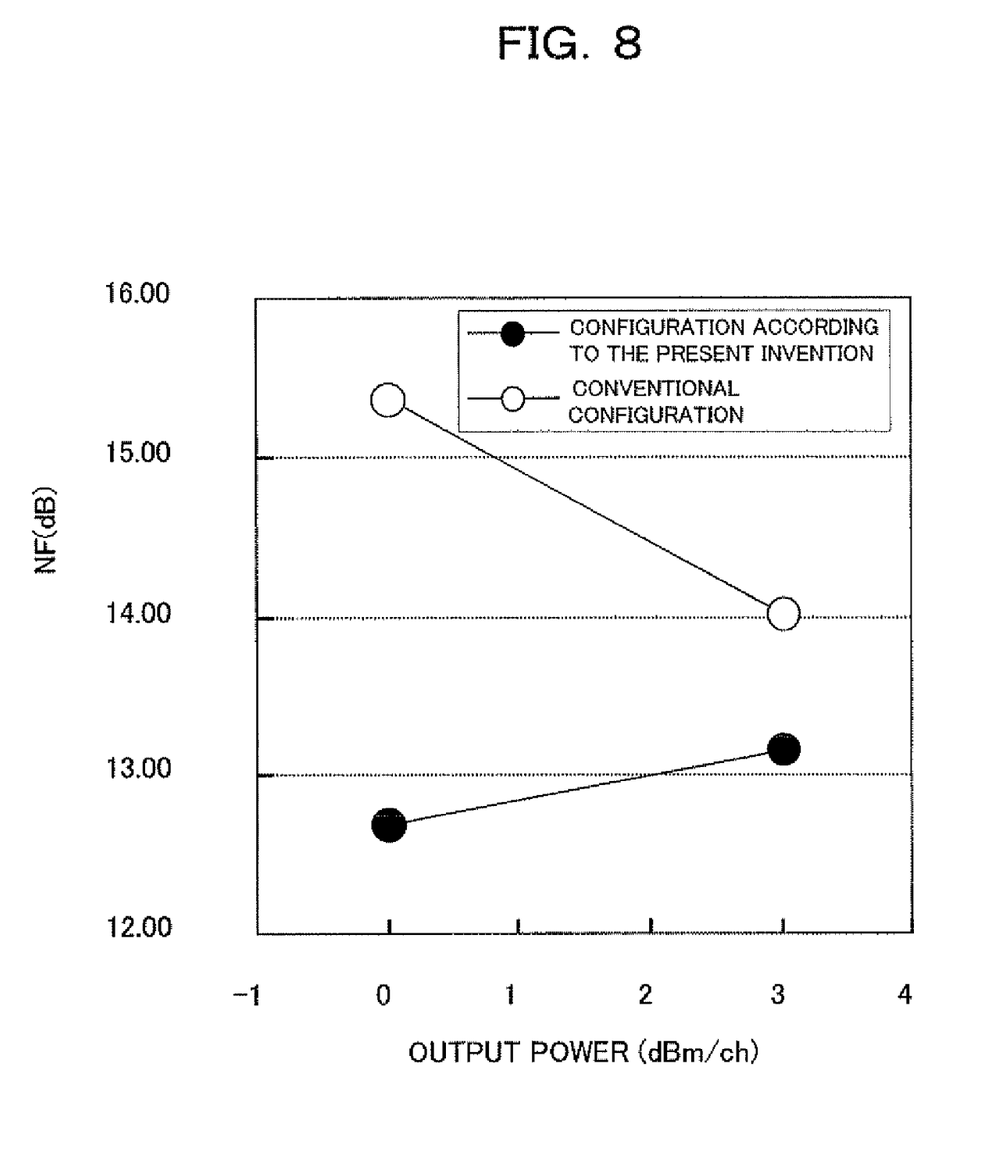
FIG. 8 is an illustration for explaining advantages of the present invention.

Still additionally, in a conventional technique, a VOA internally contained in the EDFA absorbs an input dynamic range. According to the present invention, the excitation control circuit 7 and the distribution ratio control circuit 8 can execute the gain control for the EDFA itself and adjust the excitation power for the Raman amplification to absorb the aforesaid input dynamic range while securing the gain flatness characteristic (that is, it is possible to cope with a variation of the input signal light level), which eliminates the need for the VOA required to absorb the input dynamic range. This can improve the noise characteristic in comparison with the conventional configuration. For example, as shown in FIG. 8, the noise facto (NF) to output power for each channel is considerably reducible in comparison with the conventional configuration.

Yet additionally, in the conventional configuration internally containing the VOA, for adjusting (lowering) the signal output power of the EDFA while maintaining the output flatness characteristic, there is a need for the VOA to have a loss margin, which causes the degradation of the noise characteristic. According to the present invention, the gain of the EDFA itself is changed and the Raman amplifier can compensate for the output flatness characteristic, thereby enabling a change of the signal output without causing the degradation of the noise characteristic.

In particular, in an L-band system using a wavelength of 1450 nm or more a Raman pump light wavelength, from the viewpoint of the gain efficiency, the sharing of pump light between a Raman amplifier and an EDFA is feasible with high efficiency, which further contributes to the lowering of dissipation power and the reduction of noise.

(b) Description of Second Embodiment

Figure 9:
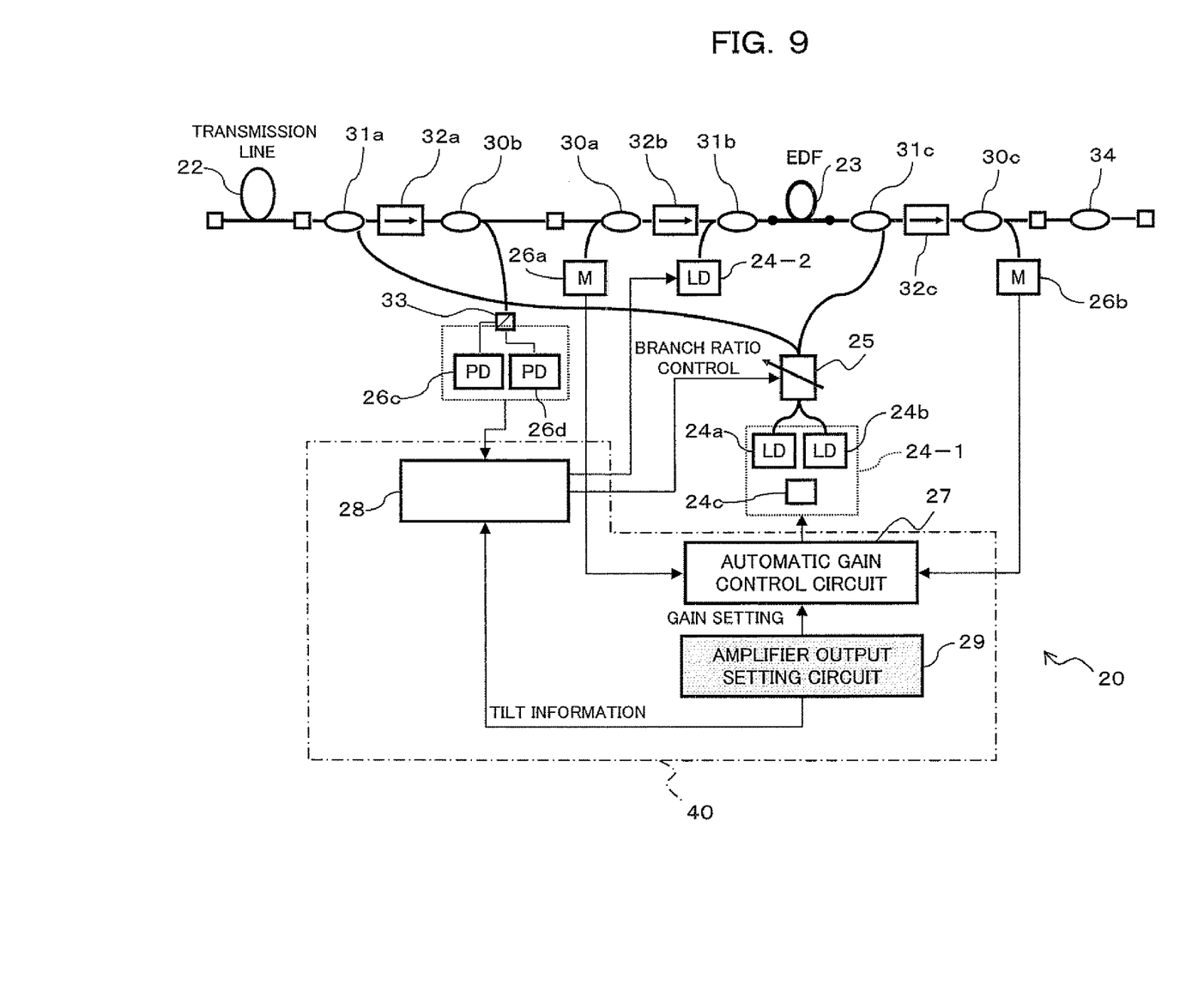
FIG. 9 is an illustration of an optical amplifier according to a second embodiment of the present invention.

FIG. 9 is an illustration of an optical amplification repeater 20 according to a second embodiment of the present invention. This optical amplification repeater 20 shown in FIG. 9 is connected to a transmission line fiber 22 serving as an input side transmission line and a transmission line fiber 34 serving as an output side transmission line for repeating wavelength-multiplexed light, and it comprises an EDF 23, first and second excitation outputting units 24-1 and 24-2, LDs 24a and 24b, a level monitor 24c, a variable distribution element 25, PDs 26a to 26d, an excitation control circuit (excitation control unit) 27, a distribution ratio control circuit (distribution ratio control unit) 28, an amplifier output setting circuit 29, branch couplers 30a to 30c, multiplexers 31a to 31c and a wavelength filter 33 which respectively correspond to the components designated at reference numerals 3 to 9, 10a to 10c, 11a to 11c and 13 in the above-described optical amplifier 1 according to the first embodiment, and further comprises optical isolators 32a to 32c. In other words, an optical transmission line fiber 21 experiencing the Raman amplification and the optical amplification repeater 20 constitute an optical amplifier 35.

In addition, the above-mentioned excitation control circuit 27, distribution ratio control circuit 28 and amplifier output setting circuit 29 constitute a control unit 40 similar to that in the first embodiment.

With this configuration, signal light is inputted from the left end of the transmission line and distribution-Raman-amplified in a distributed constant manner with the transmission line fiber 22 being taken as an amplification medium, and after the optical amplification is made in a manner such that the EDF 3 is taken as an EDFA, it is outputted to the output side transmission line fiber 34, thus replaying the optical signal.

Also in the optical amplifier 30 thus configured, as well as the above-described first embodiment, the first pump light outputting unit 24-1 can share the pump light for the Raman amplification in the transmission line fiber 22 and the pump light for the amplification by the EDF 23, and the control unit 40 can executes the control to supply the pump light, outputted from the first pump light outputting unit 24-1, to the transmission line fiber 22 and the EDF 23 according to wavelength arrangement of the respective signal lights wavelength-multiplexed into wavelength-multiplexed signal light, thereby providing the same advantages as those of the above-described first embodiment.

(c) Others

The present invention is not limited to the above-described embodiments, and it covers all changes and modifications of the embodiments of the invention herein which do not constitute departures from the spirit and scope of the invention.

The disclosure of the embodiments of the present invention enables a person skilled in the art to manufacture an apparatus according to the present invention.

What is claimed is:

1. An optical amplifier comprising:
   a Raman amplification medium receiving wavelength-multiplexed signal light;
   a rare earth doped fiber located at a latter stage of said Raman amplification medium;
   a first pump light outputting unit for outputting pump light with a plurality of wavelengths including a wavelength which fulfills an amplification function for the wavelength-multiplexed signal light in both said Raman amplification medium and said rare earth doped fiber;
   a variable distribution element for distributing the pump light with the plurality of wavelengths, outputted from said first pump light outputting unit, to said Raman amplification medium and said rare earth doped fiber in a variable distribution ratio for each wavelength; and
   a control unit for individually controlling the distribution ratio for each wavelength in said variable distribution element and power of the pump light with the plurality of wavelengths from said first pump light outputting unit in accordance with a wavelength arrangement of each of signal lights wavelength-multiplexed into the wavelength-multiplexed signal light.

2. The optical amplifier according to claim 1, wherein said Raman amplification medium and said rare earth doped fiber are connected in the order of said Raman amplification medium to said rare earth doped fiber.

3. The optical amplifier according to claim 1, wherein a dispersion compensation fiber is used as said Raman amplification medium to carry out discrete Raman amplifier.

4. The optical amplifier according to claim 1, wherein a transmission line fiber is used as said Raman amplification medium to carry out a distributed Raman amplifier.

5. The optical amplifier according to claim 1, wherein, in addition to said first pump light outputting unit, a second pump light outputting unit is provided to excite said rare earth doped fiber.

6. The optical amplifier according to claim 1, wherein said control unit includes a distribution ratio control unit for controlling a distribution ratio in said variable distribution element and an excitation control unit for controlling pump light power to be outputted from said first pump light outputting unit, said distribution ratio control unit and said excitation control unit being controlled in accordance with a wavelength of each of the signal lights multiplexed into the wavelength-multiplexed signal light.

7. The optical amplifier according to claim 2, wherein said control unit includes a distribution ratio control unit for controlling a distribution ratio in said variable distribution element and an excitation control unit for controlling pump light power to be outputted from said first pump light outputting unit, said distribution ratio control unit and said excitation control unit being controlled in accordance with a wavelength of each of the signal lights multiplexed into the wavelength-multiplexed signal light.

8. The optical amplifier according to claim 3, wherein said control unit includes a distribution ratio control unit for controlling a distribution ratio in said variable distribution element and an excitation control unit for controlling pump light power to be outputted from said first pump light outputting unit, said distribution ratio control unit and said excitation control unit being controlled in accordance with a wavelength of each of the signal lights multiplexed into the wavelength-multiplexed signal light.

9. The optical amplifier according to claim 4, wherein said control unit includes a distribution ratio control unit for controlling a distribution ratio in said variable distribution element and an excitation control unit for controlling pump light power to be outputted from said first pump light outputting unit, said distribution ratio control unit and said excitation control unit being controlled in accordance with a wavelength of each of the signal lights multiplexed into the wavelength-multiplexed signal light.

10. The optical amplifier according to claim 5, wherein said control unit includes a distribution ratio control unit for controlling a distribution ratio in said variable distribution element and an excitation control unit for controlling pump light power to be outputted from said first pump light outputting unit, said distribution ratio control unit and said excitation control unit being controlled in accordance with a wavelength of each of the signal lights multiplexed into the wavelength-multiplexed signal light.

11. An optical amplification repeater, which is connected to an input side optical transmission line and an output side optical transmission line to relay wavelength-multiplexed light, comprising:

a rare earth doped fiber;

a first pump light outputting unit for outputting pump light with a plurality of wavelengths including a wavelength which fulfills an amplification function for wavelength-multiplexed signal light in both said input side optical transmission line and said rare earth doped fiber;

a variable distribution element for distributing the pump light to said input side optical transmission line and said rare earth doped fiber in a variable distribution ratio; and a control unit for individually controlling each of the distribution ratio of the pump light with the plurality of wavelengths in said variable distribution element and power of the pump light with the plurality of wavelengths from said first pump light outputting unit in accordance with a wavelength arrangement of each of signal lights wavelength-multiplexed into the wavelength-multiplexed signal light.

12. A pump light supply control method for an optical amplifier including a Raman amplification medium receiving wavelength-multiplexed signal light, a rare earth doped fiber located at a latter stage of said Raman amplification medium, a first pump light outputting unit for outputting pump light with a plurality of wavelengths including a wavelength which fulfills an amplification function for the wavelength-multiplexed signal light in both said Raman amplification medium and said rare earth doped fiber, a variable distribution element for distributing the pump light with the plurality of wavelengths, outputted from said first pump light outputting unit, to said Raman amplification medium and said rare earth doped fiber in a variable distribution ratio for each wavelength, and a second pump light outputting unit for exciting said rare earth doped fiber separately from said first pump light outputting unit, comprising:

a step of, at activation of said optical amplifier, setting a distribution ratio in said variable distribution element so as to intensively supply the pump light from said first pump light outputting unit to said Raman amplification medium according to a wavelength arrangement of each of signal lights wavelength-multiplexed into the wavelength-multiplexed signal light, and then controlling pump light power in said first pump light outputting unit and the distribution ratio in said variable distribution element so that an output of said Raman amplification medium is set to provide a level of a Raman amplification output reaching a controlled target value and exceed a lower limit value set as an index for preventing an pump light spectrum from becoming unstable; and a step of supplying the pump light from said second pump light outputting unit to said rare earth doped fiber so that a level of output signal light from said optical amplifier reaches a target output level of the entire optical amplifier, and controlling the pump light power in said first pump light outputting unit and the distribution ratio in said variable distribution element.

13. The pump light supply control method according to claim 12, wherein, at a change of the target output level of the entire optical amplifier, the pump light power in said first pump light outputting unit is controlled to be changed so that the level of the output signal light from said optical amplifier reaches a target output level after changed, the distribution ratio in said variable distribution element is controlled to be changed so that the Raman amplification output of said Raman amplification medium, which varies due to the change of the pump light power in said first pump light outputting unit, reaches a Raman amplification output which is the controlled target value, and the pump light power in said first pump light outputting unit and the distribution ratio in said variable distribution element are controlled so as to flatten an inclination of an output signal light power wavelength characteristic stemming from a change of a gain of said rare earth doped fiber amplifier due to the control on the change of the distribution ratio in said variable distribution element.

* * * * *